United States Patent [19]

Fischer

[11] Patent Number: 5,800,706
[45] Date of Patent: Sep. 1, 1998

[54] NANOFIBER PACKED BEDS HAVING ENHANCED FLUID FLOW CHARACTERISTICS

[75] Inventor: Alan B. Fischer, Cambridge, Mass.

[73] Assignee: Hyperion Catalysis International, Inc., Cambridge, Mass.

[21] Appl. No.: 611,367

[22] Filed: Mar. 6, 1996

[51] Int. Cl.$^6$ .................................................. B01D 15/08
[52] U.S. Cl. ..................... 210/198.2; 210/243; 210/263; 210/502.1; 210/505; 428/367
[58] Field of Search ........................ 210/635, 656, 210/660, 198.2, 263, 502.1, 505, 243, 748; 423/447.2; 428/367, 408; 502/416, 417, 439

[56] References Cited

U.S. PATENT DOCUMENTS

| | | | |
|---|---|---|---|
| 4,384,957 | 5/1983 | Crowder | 210/656 |
| 4,663,230 | 5/1987 | Tennent | 428/367 |
| 4,810,381 | 3/1989 | Hagen | 210/502.1 |
| 4,855,091 | 8/1989 | Geus | 264/22 |
| 5,110,833 | 5/1992 | Mosbach | 521/50 |
| 5,165,909 | 11/1992 | Tennent | 423/447.3 |
| 5,171,560 | 12/1992 | Tennent | 423/447.3 |
| 5,207,915 | 5/1993 | Hagen | 210/635 |
| 5,238,621 | 8/1993 | Hagen | 264/45.3 |
| 5,248,428 | 9/1993 | Hagen | 210/656 |
| 5,456,897 | 10/1995 | Moy | 423/447.3 |
| 5,458,784 | 10/1995 | Baker | 210/674 |
| 5,569,635 | 10/1996 | Moy | 502/185 |
| 5,582,892 | 12/1996 | Anderson | 428/64.1 |
| 5,597,493 | 1/1997 | Torini | 210/799 |
| 5,626,650 | 5/1997 | Rodriguez | 95/116 |

OTHER PUBLICATIONS

Iijima, Nature vol. 354 pp. 56–58 Nov. 1991.
Weaver, Science vol. 265 pp. 611–612 Jul. 1994.
Bening (Polymer Preprints ACS Div. of Polymer Chem. 30 (1) pp. 420–421; 1990.

*Primary Examiner*—Ernest G. Therkorn
*Attorney, Agent, or Firm*—Curtis, Morris & Safford, P.C.; Barry Evans, Esq.; David Rubin, Esq.

[57] ABSTRACT

The general area of this invention relates to porous materials made from nanofiber packed beds. More particularly, the invention relates to altering the porosity or packing structure of a nanofiber packed bed structure by blending nanofibers with scaffold particulates having larger dimensions. For example, adding large diameter fibers to a nanotube packed bed to serve as a scaffolding to hold the smaller nanofibers apart and prevent the nanofiber bed structure from collapsing. This increases the average pore size of the mass by changing the pore size distribution and alters the packing structure of the packed bed. The increase in average pore size is caused by the creation of larger channels which improves the flow of liquids or gasses through these materials.

18 Claims, 5 Drawing Sheets

Cyclic Voltammograms of Fe(CN)6 at Carbon Nanotube Mat Electrode in Flow Cell

NANOFIBER PACKED BEDS HAVING ENHANCED FLUID FLOW CHARACTERISTICS

BACKGROUND OF THE INVENTION

1. Field of the Invention

The invention relates broadly to nanofiber packed beds having enhanced fluid flow characteristics and to methods of making same and methods of using same. More specifically, the invention relates to nanofibers which are uniformly or non-uniformly blended with supporting scaffold particulates to form packed beds having enhanced fluid flow rates and an increased overall average pore size. Even more specifically, the invention relates to using such packed beds for a variety of purposes including as products such as flow-through electrodes, chromatographic media, adsorbant media and filters.

2. Description of the Related Art

Nanofiber mats and assemblages have been previously produced to take advantage of the increased surface area per gram achieved using extremely thin diameter fibers. These prior mats or assemblages are either in the form of tightly, dense masses of intertwined fibers and/or are limited to microscopic structures (i.e., having a largest dimension less than 1 micron). Nanofiber mats or assemblages have been previously prepared by dispersing nanofibers in aqueous or organic mediums and then filtering the nanofibers to form a mat. The mats have also been prepared by forming a gel or paste of carbon fibrils in a fluid, e.g. an organic solvent such as propane and then heating the gel or paste to a temperature above the critical temperature of the medium, removing supercritical fluid and finally removing the resultant porous mat or plug from the vessel in which the process has been carried out. See, U.S. Pat. application No. 08/428,496 entitled "Three-Dimensional Macroscopic Assemblages of Randomly Oriented Carbon Fibrils and Composites Containing Same" by Tennent et al. hereby incorporated by reference.

One of the disadvantages of the prior assemblages or mats made by the above described methods is poor fluid flow characteristics within the structure. As suspensions of nanofibers are drained of the suspending fluid, in particular water, the surface tension of the liquid tends to pull the nanofibers into a dense packed "mat". Alternatively, the structure may simply collapse. The pore size of the resulting mat is determined by the interfiber spaces which as a result of the compression of these mats tend to be quite small. As a result, the fluid flow characteristics of such mats are poor.

Accordingly, although previous work has shown that nanofibers can be assembled into packed, thin, membrane-like assemblages through which fluid will pass, the small diameters of the nanofibers results in a very small pore structure that imposes a large resistance to fluid flow.

It would be desirable to overcome the above-mentioned disadvantages by producing a porous packed bed having enhanced fluid flow and an altered pore size distribution since there are applications for porous nanofiber packed beds that require fluid passage and the resistance to fluid transport creates serious limitations and/or drawbacks for such applications. The improved fluid flow characteristics brought about by this invention make such applications more feasible and/or more efficient.

OBJECTS OF THE INVENTION

It is therefore an object of this invention to provide porous nanofiber packed bed structures having enhanced fluid flow characteristics and/or increased average pore size.

It is another object of the invention to provide a composition of matter which comprises a three-dimensional, macroscopic nanofiber packed bed made up of a blend of randomly oriented nanofibers and larger scaffold particulates.

It is a further object of the invention to provide processes for the preparation of and methods of using the nanofiber packed beds having enhanced fluid flow characteristics.

It is a still further object of the invention to provide improved filter media, chromatographic media, adsorbant media, electrodes, EMI shielding and other compositions of industrial value based on three-dimensional nanofiber porous packed beds.

The foregoing and other objects and advantages of the invention will be set forth in or apparent from the following description and drawings.

SUMMARY OF THE INVENTION

The general area of this invention relates to porous materials made from nanofiber packed beds. More particularly, the invention relates to altering the porosity or packing structure of a nanofiber packed bed structure by blending nanofibers with scaffold particulates having larger dimensions. For example, adding large diameter fibers to a nanotube packed bed to serve as a scaffolding to hold the smaller nanofibers apart and prevent the nanofiber bed structure from collapsing. This increases the average pore size of the mass by changing the pore size distribution and alters the packing structure of the packed bed. The increase in average pore size is caused by the creation of larger channels which improves the flow of liquids or gasses through these materials.

Accordingly, the purpose of the invention is to alter the average pore size and packing structure of packed layers of nanofibers by blending in larger particulates, preferably fibers having larger diameters. The larger particulates alter the packing of the nanofibers and lead to structures with reduced resistance to fluid flow. The present invention provides the unexpected advantage of being able to form a packed bed structure from nanofibers with enhanced fluid flow characteristics as a result of the scaffolding effect provided by the scaffold particulates.

DETAILED DESCRIPTION OF THE INVENTION

Definitions

Figure 1:
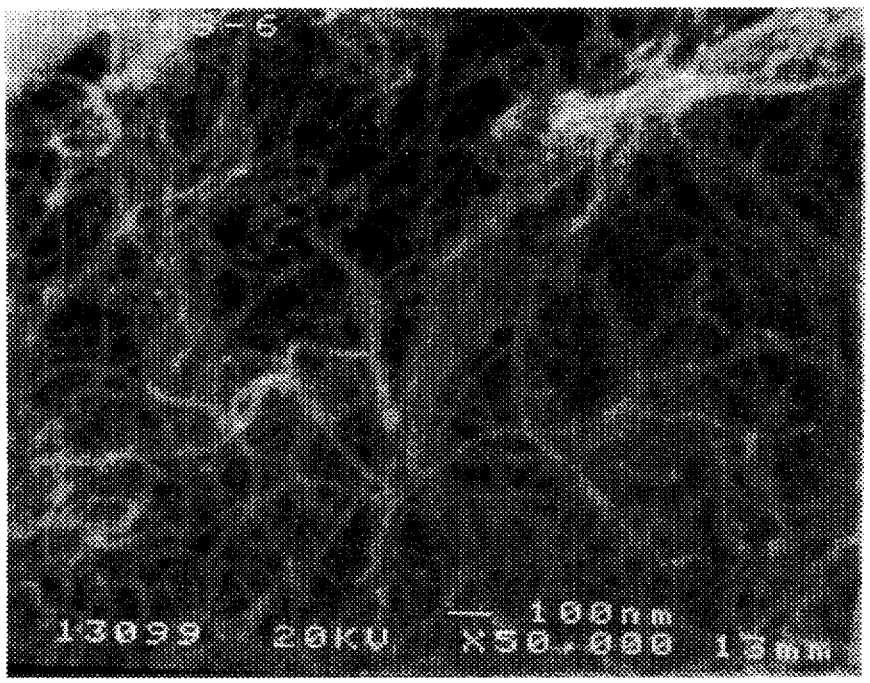
FIG. 1 is a photomicrograph (magnification of ×50,000) of a nanofiber packed bed illustrating a nanofiber mat region comprising randomly oriented intertwined carbon fibrils.

The term "fluid flow rate characteristic" refers to the ability of a fluid or gas to pass through a solid structure. For example, the rate at which a volume of a fluid or gas passes through a three-dimensional structure having a specific cross-sectional area and specific thickness or height (i.e. milliliters per minute per square centimeter per mil thickness) at a fixed pressure differential through the structure.

The term "isotropic" means that all measurements of a physical property within a plane or volume of the packed bed, independent of the direction of the measurement, are of a constant value. It is understood that measurements of such non-solid compositions must be taken on a representative sample of the packed bed so that the average value of the void spaces is taken into account.

The term "macroscopic" refers to structures having at least two dimensions greater than 1 mm.

The term "nanofiber" refers to elongated structures having a cross section (angular fibers having edges) or diameter (rounded) less than 1 micron. The structure may be either hollow or solid. This term is defined further below.

The term "packed bed", "assemblage" or "mat" refers to a structure comprising a configuration of a mass of intertwined individual nanofibers, scaffold fibers and/or scaffold particulate matter. The term "packed bed" will hereafter be construed as including and being interchangeable with the terms "mats", "assemblages" and related three dimensional structures. The term "packed bed" does not include loose masses of particulate matter.

The term "packing structure" refers to the internal structure of a packed bed including the relative orientation of the fibers, the diversity of and overall average of fiber orientations, the proximity of the fibers to one another, the void space or pores created by the interstice and spaces between the fibers and size, shape, number and orientation of the flow channels or paths formed by the connection of the void space or pores. The term "relative orientation" refers to the orientation of an individual fiber with respect to the others (i.e., aligned versus non-aligned). The "diversity of" and "overall average" of fiber orientations refers to the range of fiber orientations within the packed bed (alignment and orientation with respect to the external surface of the bed).

The term "physical property" means an inherent, measurable property of the porous packed bed, e.g. resistivity, fluid flow characteristics, density, porosity, etc.

The term "relatively" means that ninety-five percent of the values of the physical property when measured along an axis of, or within a plane of or within a volume of the structure, as the case may be, will be within plus or minus fifty percent of a mean value.

The term "scaffold particulate" refers to a particulate material suitable for providing a scaffolding effect when blended with nanofibers. At least one dimension of the "scaffold particulate" is substantially greater than at least one dimension of the nanofibers. The "scaffold particulates" can have various three-dimensional shapes including fibers, cubes, platelets, discs, etc. "Scaffold particulates" are discussed further below.

The term "substantially" means that ninety-five percent of the values of the physical property when measured along an axis of, or within a plane of or within a volume of the structure, as the case may be, will be within plus or minus ten percent of a mean value.

The terms "substantially isotropic" or "relatively isotropic" correspond to the ranges of variability in the values of a physical property set forth above.

Nanofibers

The term nanofibers refers to various fibers having very small diameters including fibrils, whiskers, nanotubes, buckytubes, etc. Such structures provide significant surface area when incorporated in a packed bed structure because of their size. Moreover, such structure can be made with high purity and uniformity. Preferably, the nanofiber used in the present invention has a diameter less than about 1 micron, preferably less than about 0.5 micron, and even more preferably less than 0.1 micron and most preferably less than 0.05 micron.

The fibrils, buckytubes, nanotubes and whiskers that are referred to in this application are distinguishable from continuous carbon fibers commercially available as reinforcement materials. In contrast to nanofibers, which have, desirably large, but unavoidably finite aspect ratios, continuous carbon fibers have aspect ratios (L/D) of at least $10^4$ and often $10^6$ or more. The diameter of continuous fibers is also far larger than that of fibrils, being always >1.0 µm and typically 5 to 7 µm.

Continuous carbon fibers are made by the pyrolysis of organic precursor fibers, usually rayon, polyacrylonitrile (PAN) and pitch. Thus, they may include heteroatoms within their structure. The graphitic nature of "as made" continuous carbon fibers varies, but they may be subjected to a subsequent graphitization step. Differences in degree of graphitization, orientation and crystallinity of graphite planes, if they are present, the potential presence of heteroatoms and even the absolute difference in substrate diameter make experience with continuous fibers poor predictors of nanofiber chemistry.

The various types of nanofibers suitable for use in porous packed bed structures are discussed below.

Carbon fibrils are vermicular carbon deposits having diameters less than 1.0 µm, preferably less than 0.5 µm, even more preferably less than 0.2 µm and most preferably less than 0.05 µm. They exist in a variety of forms and have been prepared through the catalytic decomposition of various carbon-containing gases at metal surfaces. Such vermicular carbon deposits have been observed almost since the advent of electron microscopy. A good early survey and reference is found in Baker and Harris, *Chemistry and Physics of Carbon*, Walker and Thrower ed., Vol. 14, 1978, p. 83 and Rodriguez, N., *J. Mater. Research*, Vol. 8, p. 3233 (1993), each of which are hereby incorporated by reference. (see also, Obelin, A. and Endo, M., *J. of Crystal Growth*, Vol. 32 (1976), pp. 335–349, hereby incorporated by reference).

U.S. Pat. No. 4,663,230 to Tennent, hereby incorporated by reference, describes carbon fibrils that are free of a continuous thermal carbon overcoat and have multiple ordered graphitic outer layers that are substantially parallel to the fibril axis. As such they may be characterized as having their c-axes, the axes which are perpendicular to the tangents of the curved layers of graphite, substantially perpendicular to their cylindrical axes. They generally have diameters no greater than 0.1 μm and length to diameter ratios of at least 5. Desirably they are substantially free of a continuous thermal carbon overcoat, i.e., pyrolytically deposited carbon resulting from thermal cracking of the gas feed used to prepare them. The Tennent invention provided access to smaller diameter fibrils, typically 35 to 700 Å (0.0035 to 0.070μm) and to an ordered, "as grown" graphitic surface. Fibrillar carbons of less perfect structure, but also without a pyrolytic carbon outer layer have also been grown.

U.S. Pat. No. 5,171,560 to Tennent et al., hereby incorporated by reference, describes carbon fibrils free of thermal overcoat and having graphitic layers substantially parallel to the fibril axes such that the projection of said layers on said fibril axes extends for a distance of at least two fibril diameters. Typically, such fibrils are substantially cylindrical, graphitic nanotubes of substantially constant diameter and comprise cylindrical graphitic sheets whose c-axes are substantially perpendicular to their cylindrical axis. They are substantially free of pyrolytically deposited carbon, have a diameter less than 0.1 μm and a length to diameter ratio of greater than 5. These fibrils are of primary interest in the invention.

Further details regarding the formation of carbon fibril aggregates may be found in the disclosure of U.S. Pat. No. 5,165,909 to Tennent; Snyder et al., U.S. Pat. application Ser. No. 149,573, filed Jan. 28, 1988, and PCT application No. US89/00322, filed Jan. 28, 1989 ("Carbon Fibrils") WO 89/07163, and Moy et al., U.S. Patent application Ser. No. 413,837 filed Sep. 28, 1989 and PCT application No. US90/05498, filed Sep. 27, 1990 ("Fibril Aggregates and Method of Making Same") WO 91/05089, and U.S. application Ser. No. 08/479,864 to Mandeville et al., filed Jun. 7, 1995 and U.S. application Ser. No. 08/329,774 by Bening et al., filed October 27, 1984 and U.S. application Ser. No. 08/284,917, filed Aug. 2, 1994 and U.S. application Ser. No. 07/320,564, filed Oct. 11, 1994 by Moy et al., all of which are assigned to the same assignee as the invention here and are hereby incorporated by reference.

Moy et al., U.S. application Ser. No. 07/887,307 filed May 22, 1992, hereby incorporated by reference, describes fibrils prepared as aggregates having various morphologies (as determined by scanning electron microscopy) in which they are randomly entangled with each other to form entangled balls of fibrils resembling bird nests ("BN"); or as aggregates consisting of bundles of straight to slightly bent or kinked carbon fibrils having substantially the same relative orientation, and having the appearance of combed yarn ("CY") e.g., the longitudinal axis of each fibril (despite individual bends or kinks) extends in the same direction as that of the surrounding fibrils in the bundles; or, as aggregates consisting of straight to slightly bent or kinked fibrils which are loosely entangled with each other to form an "open net" ("ON") structure. In open net structures the degree of fibril entanglement is greater than observed in the combed yarn aggregates (in which the individual fibrils have substantially the same relative orientation) but less than that of bird nests. CY and ON aggregates are more readily dispersed than BN making them useful in composite fabrication where uniform properties throughout the structure are desired.

When the projection of the graphitic layers on the fibril axis extends for a distance of less than two fibril diameters, the carbon planes of the graphitic nanofiber, in cross section, take on a herring bone appearance. These are termed fishbone fibrils. Geus, U.S. Pat. No. 4,855,091, hereby incorporated by reference, provides a procedure for preparation of fishbone fibrils substantially free of a pyrolytic overcoat. These fibrils are also useful in the practice of the invention.

McCarthy et al., U.S. Pat. application Ser. No. 351,967 filed May 15, 1989, hereby incorporated by reference, describes processes for oxidizing the surface of carbon fibrils that include contacting the fibrils with an oxidizing agent that includes sulfuric acid ($H_2SO_4$) and potassium chlorate ($KClO_3$) under reaction conditions (e.g., time, temperature, and pressure) sufficient to oxidize the surface of the fibril. The fibrils oxidized according to the processes of McCarthy, et al. are non-uniformly oxidized, that is, the carbon atoms are substituted with a mixture of carboxyl, aldehyde, ketone, phenolic and other carbonyl groups.

Fibrils have also been oxidized non-uniformly by treatment with nitric acid. International Application PCT/US94/10168 discloses the formation of oxidized fibrils containing a mixture of functional groups.

In published work, McCarthy and Bening (Polymer Preprints ACS Div. of Polymer Chem. 30 (1)420(1990)) prepared derivatives of oxidized fibrils in order to demonstrate that the surface comprised a variety of oxidized groups. The compounds they prepared, phenylhydrazones, haloaromaticesters, thallous salts, etc., were selected because of their analytical utility, being, for example, brightly colored, or exhibiting some other strong and easily identified and differentiated signal. These compounds were not isolated and are, unlike the derivatives described herein, of no practical significance.

Carbon nanotubes of a morphology similar to the catalytically grown fibrils described above have been grown in a high temperature carbon arc (Iijima, Nature 354 56 1991, hereby incorporated by reference). It is now generally accepted (Weaver, Science 265 1994, hereby incorporated by reference) that these arc-grown nanofibers have the same morphology as the earlier catalytically grown fibrils of Tennent. Arc grown carbon nanofibers are also useful in the invention.

Scaffold Particulates

Scaffold particulates are particulate solids having a shape and size suitable to providing a scaffolding effect when blended with nanofibers. The scaffold particulates are of a shape and size such that they disrupt the packing structure of the nanofibers. This results in a packed bed having an increased average pore size. The scaffolding increases the number of large pores and the average pore size, which in turn increases the flow rate of the bed. The scaffold particulates are used as a diluent and/or as a mechanically stronger scaffolding that helps overcome the forces of surface tension during the drying process which reduces the density of the nanofiber fraction of the resulting composite "mat".

Preferably, the scaffold particulates have at least one dimension larger than the largest dimension of the nanofibers, and/or at least a second largest dimension larger than the second largest dimension of the nanofiber. The largest dimension of the scaffold particle may be comparable to the largest dimension of the nanofiber. For example, nanofibers and fat fibers of the same length may be used as long as the diameters of the fat fibers are significantly larger than the diameters of the nanofibers.

Preferably, the largest dimension of the scaffold particulate is at least 10 times larger than the largest dimension of the nanofibers, more preferably 50 times greater, even more preferably 100 times greater, and most preferably 200 times greater.

Preferably, the second largest dimension of the scaffold particulate is at least 10 times larger than the second largest dimension of the nanofibers, more preferably 50 times greater, even more preferably 100 times greater, and most preferably 200 times greater.

The scaffold particulates also preferably have a largest dimension (e.g., length for a fiber) greater than 1 micron, more preferably greater than 5 microns, even more preferably greater than 10 microns and most preferably greater than 50 microns. The scaffold particulates preferably have a second largest dimension (e.g. diameter for a fiber or thickness for a disc) greater than 0.1 micron, more preferably greater than 1 micron, even more preferably greater than 3 microns and most preferably greater than 5 microns.

The shape of the scaffold particulates can take many forms as long as the particulate provides a sufficient scaffolding effect to enhance the fluid flow characteristics by the desired amount. Suitable shapes include fibers, platelets, discs, cones, pyramids, cubes, irregular solid particulates, etc.

Preferably, the scaffold particulate has a shape of a fiber. The diameter of the scaffold particulate fiber is preferably at least 10 times greater than the nanofiber diameter, more preferably 50 times greater, even more preferably 100 times greater and most preferably 200 times greater.

The surface chemistry, structure or composition of the scaffold particulate may also be modified to enhance or adjust the scaffolding effect. For example, particulates having rough surfaces may result in increased scaffolding since such particulates would be better able to hold the nanofibers apart. According to one embodiment of the invention, more that one type of scaffold particulate is incorporated into the packed bed.

The scaffold particulates may be, for example, polymeric, inorganic, glass or metallic. The particulate can have the same or different composition than the nanofiber. Preferably, the scaffold particulates are either glass fiber particles or carbon fibers.

According to a preferred embodiment, carbon fibers are used as the scaffold particulate. The carbon fibers offer the advantage for this purpose of being conductive. Metal fibers, with even greater conductivity, can also be blended in for the same purpose. Accordingly, carbon fibers, which are conductive, but also made of carbon, may be used as the scaffold particulates and mixed with carbon nanofibers to result in a carbon based packed bed having improved conductivity, enhanced fluid flow and high carbon purity.

Nanofiber Packed Beds having Enhanced Fluid Flow

The general area of this invention relates to porous packed bed materials made from packed nanofibers. The invention relates to a method for altering the porosity of a packed bed structure made by blending nanofibers with other, larger diameter fibers or particulate materials to serve as a scaffolding to hold the smaller nanofibers apart and prevent them from collapsing. The creation of larger channels within these composite materials improves the flow of liquids or gasses through these materials.

The flow of a fluid through a capillary is described by Poiseuille's equation which relates the flow rate to the pressure differential, the fluid viscosity, the path length and size of the capillaries. The rate of flow per unit area varies with the square of the pore size. Accordingly, a pore twice as large results in flow rates four times as large. The creation of pores of a substantially larger size in the nanofiber packed bed structure results in increased fluid flow because the flow is substantially greater through the larger pores.

As set forth above, nanofiber packed beds not provided with a scaffolding mechanism results in poor fluid flow characteristics. This is particularly true when liquid suspensions of nanofibers are drained of the suspending fluid and the surface tension of the liquid tends to pull the nanofibers into a dense packed "mat" with the pore size determined by the interfiber spaces which tend to be quite small. This results in a packed bed having poor fluid flow characteristics.

Figure 2:
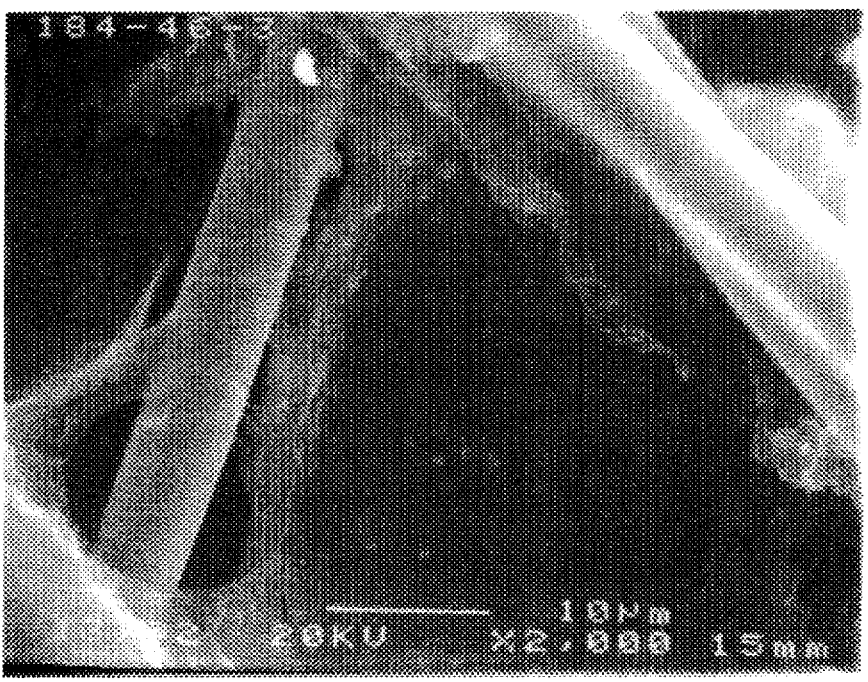
FIG. 2 is a photomicrograph (magnification of ×2,000) illustrating a packed bed comprising scaffold fiber particulates and web-like structures of randomly oriented intertwined carbon fibrils.
Figure 3:
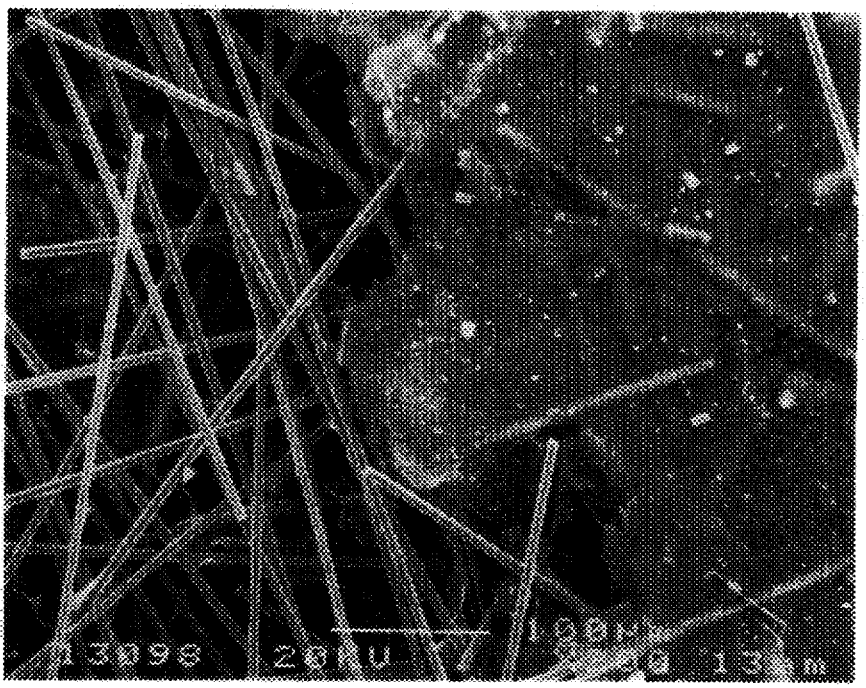
FIG. 3 is a photomicrograph (magnification of ×200) illustrating scaffold particulates in the form of fibers (4–8 μm in diameter) and web-like regions of fibril mats.
Figure 4:
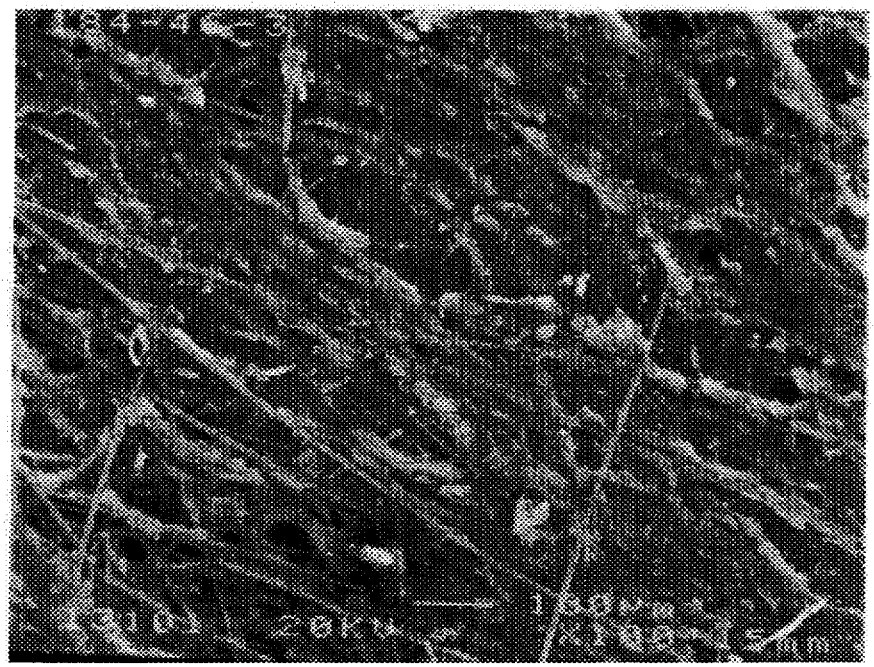
FIG. 4 is a photomicrograph (×100) of a packed bed structure according to the present invention.

When the nanofiber packed beds are formed without the scaffold particulates, they collapse and form dense mats. The scaffold particulates hold up the mats and break or tear apart these mats forming discontinuous nanofiber regions and void channels in between these regions. Referring to FIG. 1, the microphotograph illustrates the dense packing of the nanofibers within the nanofiber mat region or domain. FIG. 2 is a microphotograph of lower magnification illustrating the nanofiber domains clinging to and forming "web-like" structures between and upon the scaffold particulates. The intertwined fibrous structures of nanofibers cause them to cling together to form the web-like or felt-like structure rather than break apart completely into discrete particles. If non-fibrous nano particles (for example, spheres) were used, these particles would simply fall through the structure and segregate to the bottom. FIGS. 3 and 4 are lower magnification microphotographs of packings containing carbon fibrils and carbon fibers.

Surprisingly, packed beds comprising larger scaffolding particulates blended together with nanofibers offer improved flow characteristics. This permits the high surface area of the nanofibers to be more readily utilized in situations where bulk fluid or gas transport through the material is needed.

The enhanced packing structure of the packed bed provides large flow channels that enable a large surface area of nanofibers to be accessible. That is, the nanofibers that line the outer walls of or are in contact with the large flow channels formed within the composite structure allow an increased amount of accessible nanofiber surface area.

One aspect of the invention relates to a composition of matter comprising a porous packed bed having a plurality of nanofibers and a number of scaffold particulates blended to form a porous structure. Preferably, the packed bed has an enhanced fluid flow characteristic. Preferably, the fluid flow rate of water is greater than 0.5 ml/min/cm$^2$ at a pressure differential across the packed bed of about 1 atm for a bed having a thickness of one mil, more preferably greater than 1.0 ml per min per cm$^2$.

Broadly, the invention is in a composition of matter consisting essentially of a three-dimensional, macroscopic assemblage of a multiplicity of randomly oriented nanofibers, blended with scaffold particulates. Preferably, the beds have at least two dimensions greater than 1 mm, more preferably greater than 5 mm. Preferably, the resulting packed beds have a bulk density of from 0.1 to 0.5 gm/cc.

The packed bed made according to the invention have structural and mechanical integrity. That is, the beds can be handled without breaking or falling apart, although the beds may be somewhat flexible. The packed beds have a felt-like character as a result of the nanofibers intertwining together to form a random woven-like structure. The packed beds have significantly higher strengths and toughness compared to simple loose particulate masses.

Preferably, the packed bed of the invention has at least one fluid flow characteristic that is greater than that of a nanofiber packed bed without said scaffold particulates. That is, the addition of the scaffold particulates enhances the fluid flow rate, for example, compared to a nanofiber packed bed without the scaffold particulates. Preferably, the scaffolding addition increases the flow rate by a factor of at least two, more preferably by a factor of at least five, even more preferably by a factor of at least ten, and most preferably by a factor of at least 50.

According to one preferred embodiment, the packed bed has a surface area greater than about 25 $m^2/g$.

Preferably, the packed bed has relatively or substantially uniform physical properties along at least one dimensional axis and desirably has relatively or substantially uniform physical properties in one or more planes within the packed bed, i.e. they have isotropic physical properties in that plane. In other embodiments, the entire packed bed is relatively or substantially isotropic with respect to one or more of its physical properties.

Preferably, the packed bed has substantially isotropic physical properties in at least two dimensions. When fibers or platelets are used as the scaffold particulates, they tend to align in single plane. However, the resulting structure is isotropic in the plane of alignment. The packed bed may have a uniform or nonuniform distribution of scaffold particulates and nanofibers.

According to one embodiment of the invention, the distribution of scaffold particulates within the nanofiber packed bed is nonuniform. As can be seen from comparing FIGS. 1, 2, 3 and 4, although the distribution may appear uniform at lower magnifications, high magnifications indicate the nanofibers may congregate and form web-like domains. Although this may occur, the macroscopic properties of the material can be relatively uniform as shown in FIG. 4. Alternatively, the packed structure may be non-uniform. For example, a thin layer region having a higher concentration of nanotubes may be formed on the top portion of the packed bed. Alternatively, the thin layer of nanofibers may be formed at a bottom portion or within the packed bed structure. The distribution of the scaffold particulates may be varied to alter the properties of the packed bed.

The average pore size and overall packing structure of the packed bed can be adjusted by varying several parameters. These parameters include: (a) the weight percent of nanofiber and/or support particulate, (b) the size, shape and surface characteristics of the nanofiber and/or scaffold particulate, (c) the composition of the nanofiber and/or scaffold particulate (e.g., carbon vs. metal), and (d) the method of making the packed bed.

Although the interstices between the nanofibers are irregular in both size and shape, they can be thought of as pores and characterized by the methods used to characterize porous media. The size distribution of the interstices and void space within in such networks can be controlled by the concentration and level of dispersion of nanofibers blended with the scaffold supports. The addition of the scaffolds to the nanofiber packings causes an altering of the pore size distribution. Although the pore size within the nanofiber mat domains are not significantly altered, the breaking apart of these domains results in larger void channels between the nanofiber domains. The result is a bimodal pore size distribution. Small pure spaces with the nanofiber domains and large void space between these domains.

According to one embodiment, the porous packed beds may contain an amount of nanofibers ranging from 1 weight percent to 99 weight percent, preferably 1 weight percent to 95 weight percent, even more preferably 1 weight percent to 50 weight percent, and most preferably 5 weight percent to 50 weight percent. The corresponding amount of scaffold particulate ranges from 99 to 1 weight percent, more preferably 99 to 5 weight percent, even more preferably 99 to 50 weight percent and most preferably 95 to 50 weight percent.

According to another embodiment, the porous packed beds may comprise a non-void solid volume having an amount of nanofibers ranging from 1 volume percent to 99 volume percent, preferably 1 volume percent to 95 volume percent, even more preferably 1 volume percent to 50 volume percent, and most preferably 5 volume percent to 50 volume percent. The corresponding amount of scaffold particulate ranges from 99 to 1 volume percent (of non-void solid volume), more preferably 99 to 5 volume percent, even more preferably 99 to 50 volume percent and most preferably 95 to 50 volume percent.

Figure 6:
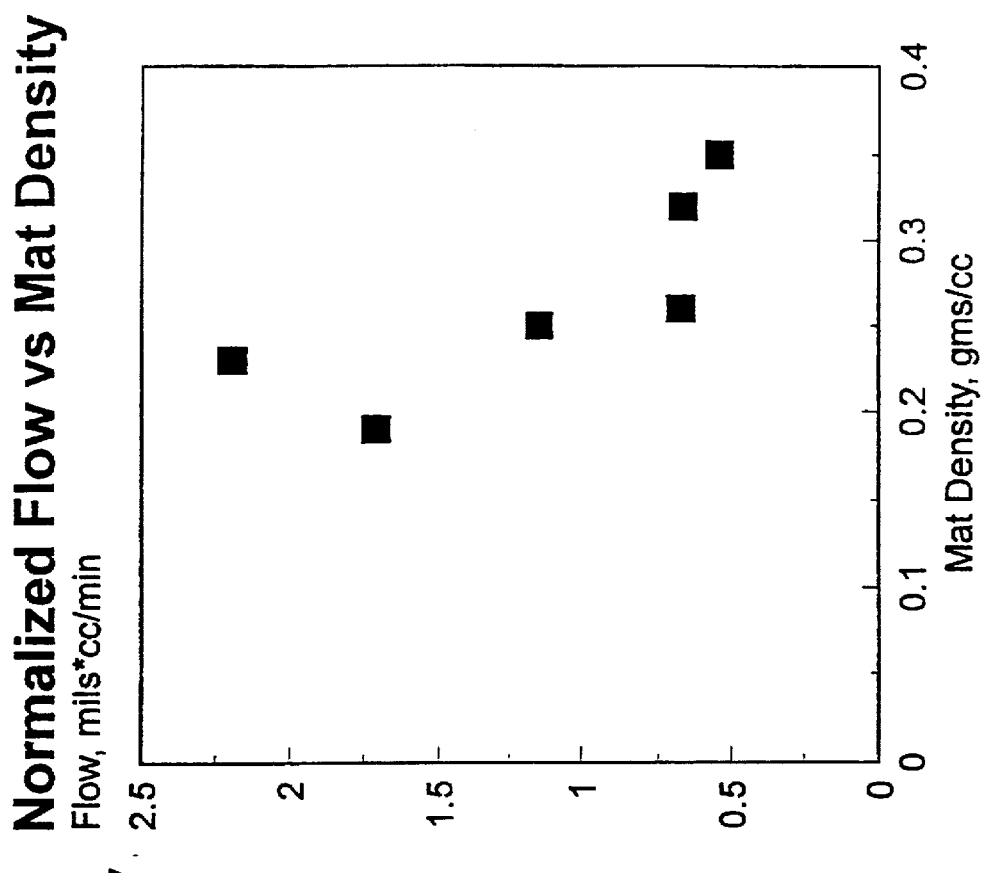
FIG. 6 illustrates a graphical representation of the flow rate/mat density relationship of a comparative carbon nanofiber mats (without scaffolding) wherein the vertical axis represents flow rate normalized for mat thickness and the horizontal axis represents mat density.
Figure 5:
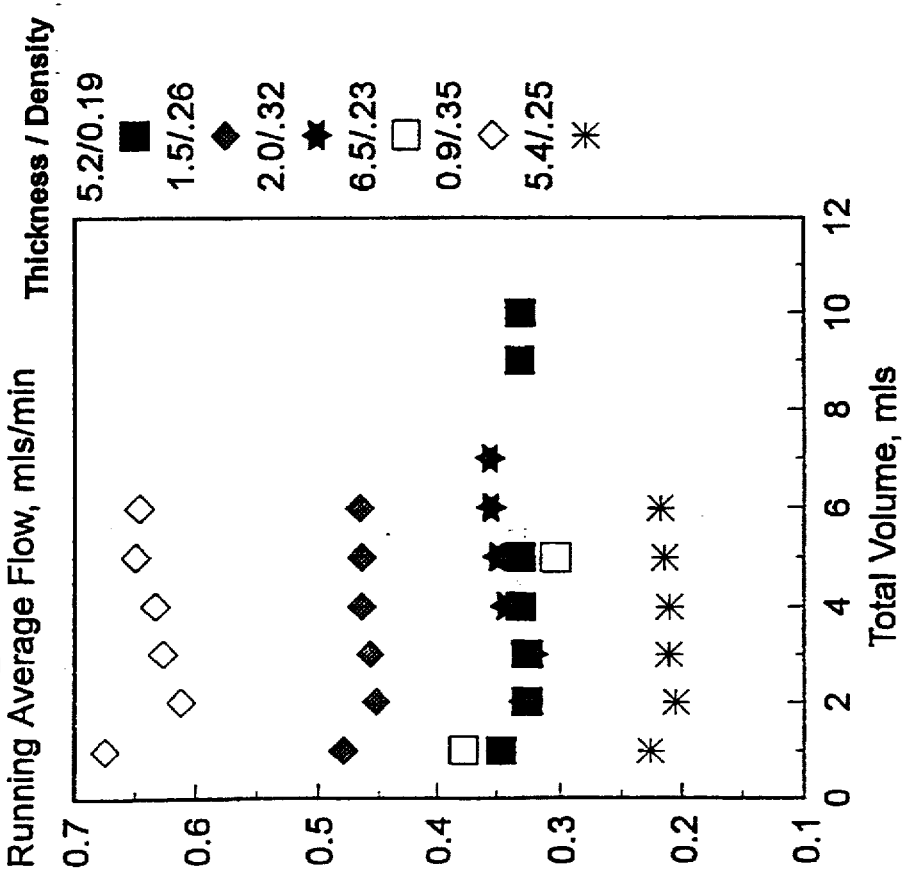
FIG. 5 illustrates a graphical representation of the flow rate/mat structure relationship for comparative nanofiber mats (without scaffolding) wherein the vertical axis represents flow rate and the horizontal axis represents the total volume flow through the mat for mats with different thickness and densities.
Figure 7:
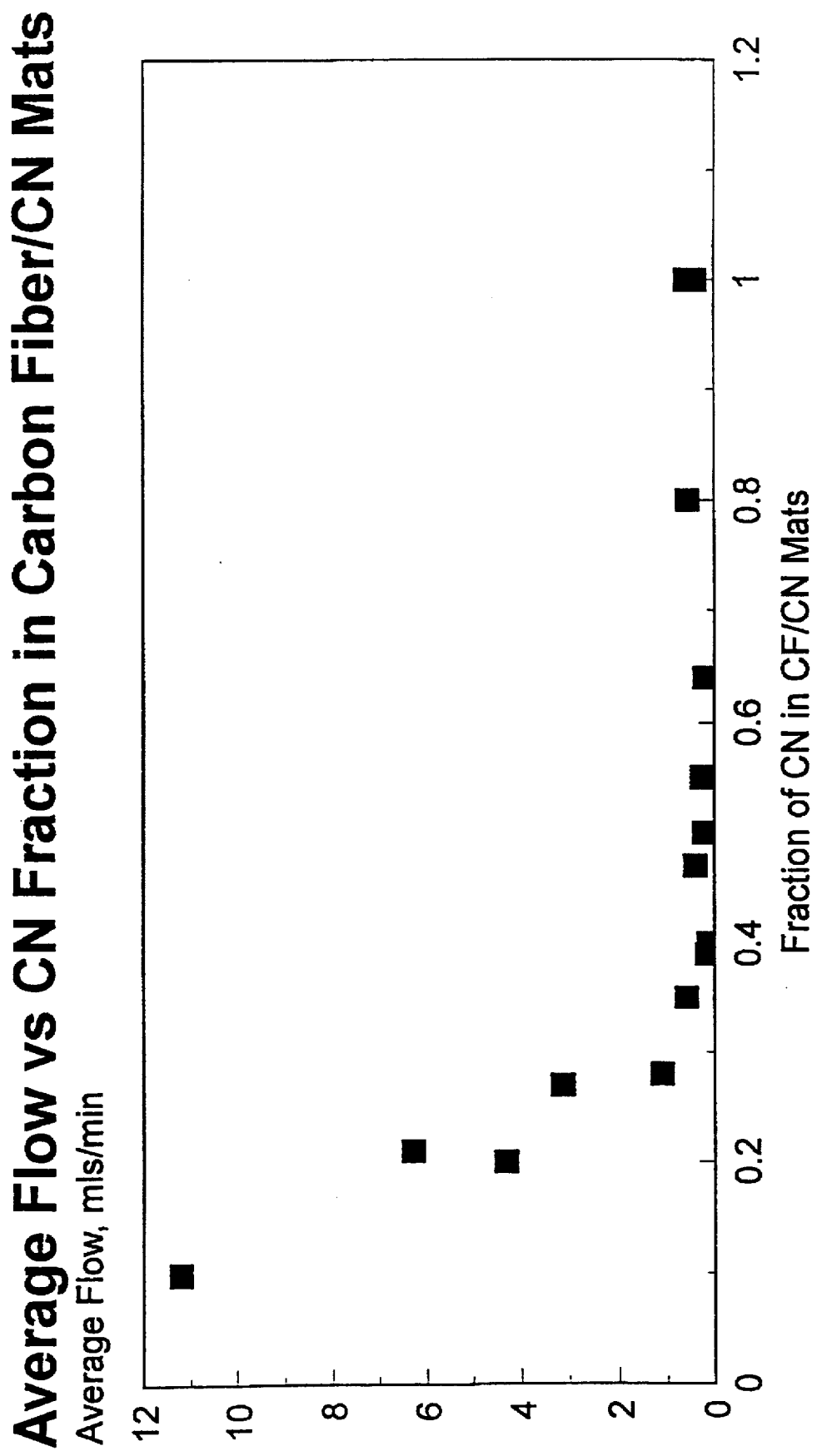
FIG. 7 illustrates a graphical representation of the flow rate/nanofiber fraction relationship of one embodiment of the invention wherein the vertical axis represents flow rate and the horizontal axis represents fraction of nanofibers by weight in a packing bed containing carbon fibrils and carbon fibers.

As discussed above, varying the amount of nanofiber and scaffold particulate varies the packing structure, and accordingly varies the fluid flow characteristics. FIG. 5 is a graphical representation of the relationship between water fluid flow and mat thickness for a carbon fibril mat (2 $cm^2$) without scaffold particulates. FIG. 6 illustrates a graphical representation of the flow rate vs. mat density. As can be seen from the graph, the fluid flow characteristics for these mats are poor. The flow rate decreases exponentially as the mat density is increased, corresponding to a decrease in pore volume. FIG. 7 is a graphical representation of the fluid flow rate/nanofiber fraction relationship for a packed bed (2 $cm^2$) made according to the present invention. As can be seen from the graph, increased flow rates are achieved by adding scaffold fibers to a nanofiber mat.

According to one preferred embodiment of the invention, the nanofibers have an average diameter less than 0.1 micron and said scaffold particulates have a first dimension greater than about 1 micron and a second dimension greater than about 0.5 micron.

According to one embodiment of the invention, the packed bed further comprises an additive (e.g. particle additive) as a third component incorporated within the bed in an amount ranging from 0.01 wt % to 50 wt %, more preferably 0.01 to 20 wt %, even more preferably 0.01 to 10 wt % and most preferably from 0.01 to 5 wt %.

Methods of Making Nanofiber Packed Beds

Generally, the method involves blending the nanofibers with the scaffold particulates to form a packed bed structure. Suitable comparable methods are set forth in U.S. application Ser. No. 08/428,496 filed Apr. 27, 1995, hereby incorporated by reference.

According to one embodiment of the invention, a porous composite packed bed having a plurality of nanofibers and a number of scaffold particulates is prepared by a method comprising the steps of:

(a) dispersing the nanofibers and the scaffold particulates in a medium to form a suspension; and (b) separating the medium from the suspension to form the packed bed.

According to one preferred embodiment of the invention, packed beds were formed using either glass fibers from commercial glass fibers (e.g., Whatman® GF/B glass fiber filter paper) or chopped carbon fibers as the scaffold particulates. In both cases, nanofibers (graphite fibrils) and the larger fibers were mixed together to form suspensions of the two and filtered on a vacuum filter manifold to remove the fluid and form a dry, packed "mat" or bed.

The medium is preferably selected from the group consisting of water and organic solvents.

The step of separating may comprise filtering the suspension or evaporating the medium from said suspension.

According to one embodiment, the suspension is a gel or paste comprising the nanofibers and scaffold particulates in a fluid. The step of separating may comprise the steps of:

(a) heating the gel or paste in a pressure vessel to a temperature above the critical temperature of said fluid;

(b) removing supercritical fluid from the pressure vessel; and (c) removing said porous composite packed bed from the pressure vessel.

According to another embodiment, a slurry of carbon nanotubes is prepared and chopped or milled segments of support particulates are added to a suspension containing the nanofibers and agitated to keep the materials dispersed. The medium is subsequently separated from the suspension forming a packed bed having good fluid flow characteristics. Support fiber particulates of ⅛ inch in length and even smaller work well.

Methods of Using Nanotube Packed Beds

The fibril packed beds may be used for purposes for which porous media are known to be useful. These include filtration, electrodes, adsorbants, chromatography media, etc. In addition, the packed beds are a convenient bulk form of nanofibers and may thus be used for any known applications including especially EMI shielding, polymer composites, active electrodes, etc.

For some applications like EMI shielding, filtration and current collection, unmodified nanofiber packed beds can be used. For other applications, the nanofiber packed beds are a component of a more complex material, i.e. they are part of a composite. Examples of such composites are polymer molding compounds, chromatography media, electrodes for fuel cells and batteries and ceramic composites, including bioceramics like artificial bone. In some of these composites, like molding compounds and artificial bone, it is desirable that the non-nanofiber components fill—or substantially fill—the porosity of the packed bed. For others, like electrodes and chromatography media, their usefulness depends on the composite retaining at least some of the porosity of the packed bed.

The rigid networks can also serve as the backbone in biomimetic systems for molecular recognition. Such systems have been described in U.S. Pat. No. 5,110,833 and International Patent Publication No. WO93/19844.

The above described packed bed products may be incorporated in a matrix. Accordingly, a non-nanofiber component is filtrated through the bed and solidified to form a composite. Preferably, the matrix is an organic polymer (e.g., a thermoset resin such as epoxy, bismaleimide, polyamide, or polyester resin; a thermoplastic resin; a reaction injection molded resin; or an elastomer such as natural rubber, styrene-butadiene rubber, or cis-1,4-polybutadiene); an inorganic polymer (e.g., a polymeric inorganic oxide such as glass), a metal (e.g., lead or copper), or a ceramic material (e.g., Portland cement).

Packed Beds as Electrodes

According to one preferred embodiment, the above-described packed beds are used as and have been shown to be good porous electrode materials. Accordingly, another aspect of the invention relates to flow through electrode materials comprising the nanofiber packed beds having enhanced fluid flow characteristics. The porous electrode material is made from the packed bed mixtures of nanofibers and scaffold particulates. The electrode materials can take advantage of the composite properties of different materials in the composite mix. Moreover, the conductivity of the assemblage can be increased when mixing various conductive scaffold particulates with the nanofibers.

According to one embodiment, electrodes may be made by attaching a conductive wire to sections of the packed beds with conductive epoxy. Such electrodes may be examined by cyclic voltammetry. It was observed that the material filtered better than the fibrils would have alone.

According to another embodiment, an electrical contact is formed by forming the packed bed on a conductive surface. For example, the packed bed may be formed by filtering the packed bed onto a conductive mesh. Preferably, a gold, platinum, nickel or stainless steel mesh or screen is used.

Moreover, the conductivity may be limited by the inner connection of the nanofibers. Composites having larger fibers blended in with the nanofibers offers improved porosity and/or flow characteristics as well as conductivity. This permits the surface area of the nanofibers to be more readily utilized in electrode applications in situations where both conductivity and fluid flow through the material are needed.

The addition of different amounts of larger scaffold particulates with a fixed amount of nanofibers allows the internal volume to be fine "tuned". The small pore sizes within the structure results in thin film electrochemical behavior, the effective "thickness" of the film layer effect can be varied. Thus porous, highly conductive electrodes can be made with different effective void volumes.

EXAMPLES

The following examples are illustrative of some of the products and methods of making the same falling within the scope of the present invention. They are, of course, not to be considered in any way limitative of the invention. Numerous changes and modification can be made with respect to the invention.

EXAMPLE I (Comparative)

Preparation of Fibril Mats Using Prior Methods

A dilute dispersion of fibrils is used to prepare porous mats or sheets. A suspension of fibrils is prepared containing 0.5% fibrils in water using a Waring blender. After subsequent dilution to 0.1%, the fibrils are further dispersed with a probe type sonifier. The dispersion is then vacuum filtered to form a mat, which is then oven dried.

The mat has a thickness of about 0.20 mm and a density of about 0.20 gm/cc corresponding to a pore volume of 0.90. The electrical resistivity in the plane of the mat is about 0.02 ohm/cm. The resistivity in the direction perpendicular to the mat is about 1.0 ohm/cm. The fluid flow characteristics of the mat are poor.

EXAMPLE II (Comparative)

Preparation of Fibril Mats Using Prior Methods

A suspension of fibrils is prepared containing 0.5% fibrils in ethanol using a Waring Blender. After subsequent dilution to 0.1%, the fibrils are further dispersed with a probe type sonifier. The ethanol is then allowed to evaporate and a mat is formed. The fluid flow characteristics of the mat are poor.

EXAMPLE III (Comparative)

Preparation of Porous Fibril Plugs Using Prior Methods

Supercritical fluid removal from a well dispersed-fibril paste is used to prepare low density shapes. 50 cc of a 0.5% dispersion in n-pentane is charged to a pressure vessel of slightly larger capacity which is equipped with a needle valve to enable slow release of pressure. After the vessel is heated above the critical temperature of pentane (Tc=196.6 C. °), the needle valve is cracked open slightly to bleed the supercritical pentane over a period of about an hour.

The resultant solid plug of Fibrils, which has the shape of the vessel interior, has a density of 0.005 g/cc, corresponding to a pore volume fraction of 0.997%. The resistivity is isotropic and about 20 ohm/cm. The mat has the poor fluid flow characteristics.

EXAMPLE IV (Inventive)

Preparation of composite mats of Fibrils and Glass fibers

A suspension of fibrils was prepared by mixing 2 grams of fibrils in 400 mils of DI water (0.5%, w/w) and blending in a Waring® blender for 5 minutes on high. 60 mls of the suspension was diluted to 200 mls with DI water and sonicated with a 450 Watt Branson® probe sonicator for 13 minutes on high power with a 100% duty cycle to make a stock fibril dispersion. Disks (0.25 inch diameter, 6.6 mg/disk) were punched from a Whatman® GF/B fiberglass filter. Aliquots of the fibril stock dispersion and fiberglass disks were mixed in the proportions indicated in Table 1:

TABLE 1

Suspensions Containing Carbon Nanotubes and Fiberglass Particulates

| Composite # | Carbon Nanotube Suspension | Fiberglass (No. of Disks) | DI water |
|---|---|---|---|
| 184-20-1 | 20 mls | 0 | 80 mls |
| 184-20-2 | 20 mls | 10 | 80 mls |
| 184-20-3 | 20 mls | 20 | 80 mls |
| 184-20-4 | 20 mls | 30 | 80 mls |
| 184-20-5 | 20 mls | 40 | 80 mls |

Each 100 ml mixture was sonicated for an additional 4 minutes on high power and filtered onto a 0.45 μm MSI nylon filter in a 47 mm Millipore membrane filter manifold. The fibril/fiberglass composites formed felt-like mats which were peeled off of the nylon membranes and dried for several hours at 80° C. between two pieces of filter paper under weight to maintain flatness. The area of each mat disk, defined by the dimensions of the filtration manifold, was 10 cm². Each mat was weighed and the thickness measured with calipers. The data as listed in Table 2:

TABLE 2

Mixed Fiberglass/CC Fibril Mat Data

| Mat No. | Weight (mgs) | Area (cm²) | Height (mils) | Glass Wt. (mgs)* | Fibril Wt. (mgs) | Glass d" g/cc | Fibril d" g/cc | Overall g/cc |
|---|---|---|---|---|---|---|---|---|
| 184-20-1 | 35.3 | 10 | 5.5 | 0.0 | 35.3 | 0.00 | 0.25 | 0.25 |
| 184-20-2 | 101.37 | 10 | 11.5 | 66.0 | 35.4 | 0.23 | 0.12 | 0.35 |
| 184-20-3 | 170.75 | 10 | 21.5 | 132.0 | 38.8 | 0.24 | 0.07 | 0.31 |
| 184-20-4 | 292.85 | 10 | 35.0 | 256.9 | 36.0** | 0.29 | 0.04 | 0.33 |
| 184-20-5 | 554.38 | 10 | 120.0 | 518.4 | 36.0** | 0.17 | 0.01 | 0.18 |

*6.6 mg/disk
**set to 36 mg total cc.
Glass d" and Fibril d" refer to the total weight of fibril or fiber glass divided by the total volume of the mat.

The flow characteristics of each mat were measured by monitoring water flow through each mat in a 25 mm diameter membrane filter manifold connected to a vacuum pump capable of pulling a vacuum close to 29" of Hg. The 10 cm² mats were centered and clamped into the 25 mm diameter filter manifold insuring that fluid could only flow through the mat and not around any outside edge. The DI water used for the flow studies was filtered sequentially through a 0.45 μm pore size nylon filter, a 0.2 μm pore size cellulose membrane filter and finally a 0.1 μm pore size cellulose membrane filter to remove traces of materials that might interfere with the flow studies. For each mat, the reservoir on the manifold was filled above the 15 milliliter volume line and vacuum applied to establish flow. When the meniscus at the top of water level crossed the 15 ml mark a timer was started and the time recorded as the fluid level receded to lower level marks until the 5 ml level mark was reached. The active filtration area was approximately 2 cm². In this way the fluid flow was measured at several time points during the passage of 10 mls of water. This procedure was followed for each composite mat as well as for a sheet of Whatman® GF/B fiberglass filter. The flow data are listed in Table 3:

TABLE 3

Measured Times* vs. Volume Flowed for Fibril/Fiberglass Mats

| Level mls | GF/B | 184-20-1 | 184-20-2 | 184-20-3 | 184-20-4 | 184-20-5 |
|---|---|---|---|---|---|---|
| 15 | 0.00 | 0.00 | 0.00 | 0.00 | 0.00 | 0.00 |
| 14 | — | 2.23 | 3.97 | 1.02 | 0.13 | — |
| 13 | — | 5.02 | 8.07 | 2.47 | 0.29 | 0.08 |
| 12 | — | 7.53 | — | 3.57 | 0.45 | — |
| 11 | — | 10.02 | — | 4.77 | 0.58 | 0.17 |
| 10 | — | 12.45 | — | 5.85 | 0.72 | — |
| 9 | — | — | — | 6.87 | 0.87 | 0.25 |
| 8 | — | — | — | 7.98 | 1.00 | — |
| 7 | — | — | — | 8.93 | — | 0.34 |
| 6 | — | 22.45 | — | 10.00 | 1.29 | — |
| 5 | 0.03 | 24.98 | 34.30 | 11.02 | 1.44 | 0.43 |

"—" indicates not measured
*times in minutes

For each filter mat the flow vs time was linear indicating that the mats were not being clogged and that the flow rate was constant over time. Also observed is that the flow rate increases with increasing proportions of glass fibers in the composite mats. As seen from the data in Table 3, the flow rate observed for composite mat no. 184-20-5 is nearly two orders of magnitude higher than for mat no. 184-20-1, a mat composed of fibrils alone.

EXAMPLE V (Inventive)

Preparation of composite mats of Fibrils and Carbon fibers

Composite mats of fibrils and chopped carbon fibers were prepared and examined for flow properties. A suspension of fibrils was prepared by mixing two grams of fibrils in 400 mls of DI water (0.5%, w/w) and blending in a Waring® blender for 5 minutes on high. 70 mls of the suspension was added to 280 mls of DI water, a magnetic stir bar was added and the suspension was subjected to 20 minutes of sonication with 450 Watt Bransonic® probe sonicator with constant stirring to more completely disperse the fibrils and prepare 350 mls of 0.1% w/w stock dispersion. Weighed amounts of chopped carbon fibers (⅛ inch length chopped, Renoves, ex-PAN fibers) were placed in a series of beakers (seven) in the proportions shown in Table 4.

TABLE 4

| Sample No. | WT ⅛" Chopped CF | $H_2O$ | Fibril Solution |
|---|---|---|---|
| 6 | 0 mg | 100 mls | 50 mls |
| 7 | 50 mg | 100 mls | 50 mls |
| 8 | 75 mg | 100 mls | 50 mls |
| 9 | 100 mg | 100 mls | 50 mls |
| 10 | 125 mg | 100 mls | 50 mls |
| 11 | 150 mg | 100 mls | 50 mls |
| 12 | 200 mg | 100 mls | 50 mls |

100 mls of DI water and 50 mls of the 0.1% fibril stock dispersion was added to each beaker. Each of the seven solutions was sonicated for 5 minutes with stirring and filtered onto a 0.45 µm nylon filter in a 47 mm Millipore membrane filter manifold. The mats were left on the membranes, placed between pieces of filter paper and dried overnight at 80° C. between two pieces of filter paper under a weight to maintain flatness. The weight and thickness of each 10 cm² mat was measured and the data (after subtracting for the nylon membrane weight of 93.1 mgs and thickness of 4.0 mils) are shown in Table 5 along with a listing of the fractional composition of each of the mats.

TABLE 5

| | 6 | 7 | 8 | 9 | 10 | 11 | 12 |
|---|---|---|---|---|---|---|---|
| Wt. mgs | 52.6 | 100.4 | 131.8 | 157.3 | 180.6 | 204.3 | 248.1 |
| Mils | 10.0 | 20.5 | 27.0 | 36.0 | 41.0 | 54.0 | 66.0 |
| Wt. GF | 52.6 | 53.0 | 53.0 | 53.0 | 53.0 | 53.0 | 53.0 |
| Wt. CF | 0.0 | 48.4 | 78.8 | 104.3 | 127.6 | 151.3 | 195.1 |
| % GF | 100% | 52% | 40% | 34% | 29% | 26% | 21% |
| % CF | 0% | 48% | 60% | 66% | 71% | 74% | 79% |
| d GF | 0.21 | 0.10 | 0.08 | 0.06 | 0.05 | 0.40 | 0.03 |
| d CF | 0.00 | 0.09 | 0.12 | 0.12 | 0.12 | 0.11 | 0.12 |
| d Total | 0.21 | 0.20 | 0.20 | 0.17 | 0.18 | 0.15 | 0.15 |

GF = graphic fibrils
d GF = weight of fibrils divided by total volume of mat
d CF = weight of carbon fibers divided by total volume of mat The fibril/carbon fiber mats, still on the nylon membranes, were used for flow studies as described in the previous example and the flow data are shown in Table 6. The flow through of the 0.45 µm nylon filter by itself is very high. Accordingly, its presence does not significantly alter the flow measurements of the supported mats.

TABLE 6

| Level (mls) | 6 | 7 | 8 | 9 | 10 | 11 | 12 |
|---|---|---|---|---|---|---|---|
| 15 | 0 | 0 | 0 | 0 | 0 | 0 | 0 |
| 14 | 2.0 | 8.5 | 8.6 | 2.0 | 0.8 | 0.4 | 0.2 |
| 13 | 4.1 | 14.3 | 16.6 | 3.9 | 1.8 | 0.7 | 0.5 |
| 12 | 6.1 | 19.0 | 24.6 | 5.6 | 2.8 | 1.0 | 0.7 |
| 11 | — | 22.8 | 32.1 | 7.2 | 3.7 | 1.3 | 0.9 |
| 10 | — | 26.8 | 39.2 | 8.8 | 4.5 | 1.6 | 1.2 |
| 9 | — | 30.8 | 46.2 | 10.5 | 5.4 | 1.9 | 1.4 |
| 8 | — | 35.3 | 54.0 | 12.1 | 6.3 | 2.3 | 1.6 |
| 7 | 16.3 | 39.3 | — | 13.7 | 7.2 | 2.5 | 1.8 |
| 6 | — | 44.2 | — | 15.2 | 8.1 | 2.9 | 2.1 |
| 5 | 20.6 | 48.5 | — | 16.8 | 9.0 | 3.2 | 2.3 |

For each filter mat the flow rate vs time was linear indicating that the filters were not being clogged and that the flow rate was constant over time. It is observed that compared with a plain fibril mat, the flow rate shows a slight decrease with the two lower carbon fiber concentrations but rises dramatically at higher carbon fiber levels.

EXAMPLE VI (Inventive)

Use of Fibril/Fiberglass Composites Mats as Electrodes

Pieces of the fibril/fiberglass composite mats used in Example IV of approximately 5 mm by 8 mm were cut out of the mats with a razor blade and fashioned into electrodes. The fashioning comprised connecting a length copper wire to one end of each 5 mm by 8 mm section with graphite paint (Ladd Industries) and insulating the point of contact with epoxy. The copper wire was insulated in a glass sleeve and sealed with epoxy to the mounted mat section such that only a 4 mm by 4 mm "flag" of composite mat remained exposed. Two electrodes were prepared from each mat as indicated in the table.

TABLE 7

| Composite # | Electrode # |
|---|---|
| 184-20-1 | 184-21-1, 2 |
| 184-20-2 | 184-21-3, 4 |
| 184-20-3 | 184-21-5, 6 |
| 184-20-4 | 184-21-7, 8 |
| 184-20-5 | 184-21-9, 10 |

The composite electrodes were examined by cyclic voltammetry using an EG&G PAR 273 potentiostat, a Ag/AgCl reference electrode (Bioanalytical Systems, Inc.) and a Pt gauze counter electrode in a single compartment cell (Bioanalytical Systems, Inc.) filled with a solution containing 3 mM potassium ferricyanide, 3 mM potassium ferrocyanide and 0.5M $K_2SO_4$ in water. The ferri/ferrocyanide cyclic voltammograms exhibited oxidation and reduction waves with characteristics that varied with the composition of the electrodes. Characteristic features of the cyclic voltammograms recorded at a scan rate of 25 mv/second are listed in Table 8.

TABLE 8

| Electrode No. | Thickness*/Area** | $I_{PA}$, mA | $E_{PA}$, V vs. Ag/AgCl | $E_{PC}$, V vs. Ag/AgCl |
|---|---|---|---|---|
| 184-21-1 | 5.5/0.140 | 0.6 | 0.275 | 0.225 |
| 184-21-3 | 11.5/0.215 | 1.2 | 0.295 | 0.215 |
| 184-21-5 | 21.5/0.187 | 1.4 | 0.310 | 0.21 |
| 184-21-7 | 35/0.165 | 2.7 | 0.380 | 0.14 |
| 184-21-9 | 120/0.210 | 2.7 | 0.550 | −0.02 |

*Thickness in Mils
**Area in cm²

Electrode 184-21-1, consisting solely of fibrils showed very sharp peaks with minimal peak to peak separation consistent with a redox process taking place within a porous electrode with very small pores. The peak shape and separation between anodic and cathodic peaks was similar to what would be observed with a thin layer cell. The scan rate dependence of the anodic peak current shows a nearly linear dependence for electrode 184-21-1 but becomes increasingly nonlinear as the proportion of glass fibers in the electrode material increases. The anodic peak currents, in milliamps, recorded at different scan rates are shown in Table 9.

TABLE 9

Peak Anodic Current ($I_{PA}$), mA vs. Scan Rate, mv/sec

| Scan Rate, mv/sec | Pt wire (1 cm x 0.05 cm) | 184-21-1 | 184-21-3 | 184-21-5 | 184-21-7 | 184-21-9 |
|---|---|---|---|---|---|---|
| 5 | — | — | — | — | — | 0.975 |
| 10 | — | — | — | — | 1.4 | 1.58 |
| 25 | — | 0.625 | 1.21 | 1.45 | 2.8 | 2.75 |
| 50 | 0.115 | 1.08 | 2.13 | 2.45 | 4.4 | 4.15 |
| 100 | — | 2.03 | 3.75 | 4.15 | 7 | 5.9 |

EXAMPLE VII (Inventive)

Use of Fibril/Carbon Fiber Composite Mats as Electrodes

Composite mats of fibrils and carbon fibers were used as electrodes. Carbon fibers are electrically conductive. Three fibril/carbon fiber composite mats were prepared using the method described in the earlier examples above. The proportions are as shown in Table 10.

TABLE 10

Composition of Fibril/Carbon Fiber Mats Used For Electrodes

| Composite Mat No. | Electrode Nos. | Carbon Fiber (mgs) | Carbon Nanotubes (mls of suspension) |
|---|---|---|---|
| 184-22-1 | 184-28-1, 2 | 30 | 20 |
| 184-22-2 | 184-28-3 | 60 | 20 |
| 184-22-3 | 184-28-4, 5 | 120 | 20 |

Electrodes were prepared from fibril/carbon fiber mats using the method described in Example VI. The electrode dimensions are listed in Table 11 below.

TABLE 11

| Electrode | Area (cm²) | Thickness (mils) |
|---|---|---|
| 184-28-1 | 0.146 | 11 |
| 184-28-2 | 0.118 | 11 |
| 184-28-3 | 0.182 | 18 |
| 184-28-4 | 0.175 | 37 |
| 184-28-5 | 0.193 | 37 |

The composite electrodes were examined by cyclic voltammetry using an EG&G PAR 273 potentiostat, a Ag/AgCl reference electrode (Bioanalytical Systems, Inc.) and a Pt gauze counter electrode in a single compartment cell (Bioanalytical Systems, Inc.) filled with approx. 15 mls. of a solution containing 3 mM potassium ferricyanide, 3 mM potassium ferrocyanide and 0.5M $K_2SO_4$ in water. The ferri/ferrocyanide cyclic voltammograms exhibited an oxidation and reduction waves with characteristics that varied with the composition of the electrodes. Characteristic features of the cyclic voltammograms are listed in Table 12.

TABLE 12

Summary of Cyclic Voltammetry Data of Ferri/Ferrocyanide at Fibril/Carbon Fiber Mat Electrodes

| Parameter | Pt wire | 184-28-1 | 184-28-3 | 184-28-4 |
|---|---|---|---|---|
| $E_{PA}$ | 0.32 | 0.23 | 0.290 | 0.34 |
| $E_{PC}$ | 0.15 | 0.29 | 0.215 | 0.17 |
| $E_{P-P}$ | 170 | 60 | 75 | 170 |
| $I_{PA}$ at 5 mv/sec, mA | — | — | 0.69 | — |
| $I_{PA}$ at 10 mv/sec, mA | — | 0.375 | 1.2 | 2.9 |
| $I_{PA}$ at 25 mv/sec, mA | 0.0663 | 0.80 | 2.55 | 5.3 |
| $I_{PA}$ at 50 mv/sec, mA | 0.0875 | 1.38 | 4.3 | 8.2 |
| $I_{PA}$ at 100 mv/sec, mA | 0.108 | 2.38 | 7.25 | 12.3 |

$E_{PA}$ = anodic peak potential at 25 mv/sec, V vs Ag/AgCl
$E_{PC}$ = cathodic peak potential at 25 mv/sec, V vs Ag/AgCl
$E_{P-P}$ = peak to peak potential separation at 25 mv/sec, mv
$I_{PA}$ = anodic peak current All three of the carbon nanotube/carbon fiber composite electrodes showed very sharp oxidation and reduction peaks with minimal peak to peak separation consistent with a redox process taking place within porous electrodes having very small pores. The peak shape and separation between anodic and cathodic peaks is similar to that observed for a thin layer cell. The scan rate dependence of the anodic peak current shows a nearly linear dependence for electrode 184-28-1, but some deviation from linear dependence is observed for electrodes 184-28-3 and 184-28-4. Each composite mat has the same amount of carbon nanotubes per unit area, but the addition of the carbon fibers to the composite results in an increase in thickness and hence electrode volume. The peak currents and integrated currents increase with the electrode volume as expected due the increased amounts of ferri/ferrocyanide solution within the porous electrode.

These results demonstrate that the porosity of the fibril mat electrodes can be modified through the formation of composites with larger diameter fibers and enabling access to greater amounts of material in the solution phase. Further, the use of conducting carbon fibers retains the conductive nature of the fibril mats as the fibrils in the mats are diluted with the larger carbon fibers in the composite.

The carbon fibers have a diameter of approx. 7–8 μm and the fibrils have a diameter of approx. 0.01 μm. Thus even though the fibril mat used to make electrode 184-28-4 contains 80% carbon fibers (w/w) the carbon fibers contribute little to the total electrode surface area. This is confirmed by measurements of the double layer capacitance charging currents which correlate with the electrochemically accessible surface area. The double layer charging currents were measured by recording cyclic voltammograms at 10 mv/sec in an electrolyte containing only 0.5 M $K_2SO_4$ in water. One half of the total current difference between the cathodic and anodic sweeps of the cyclic voltammogram measured at 0.0 V vs Ag/AgCl was taken as the double layer charging current (Idl). As seen from the data in Table 13, double layer charging current, normalized for electrode area and therefore fibril mass, is nearly constant even though the carbon fiber content of the electrode materials varies over a wide range.

TABLE 13

| Electrode | Idl, mA | Area | Idl/Area |
|---|---|---|---|
| 184-28-1 | 0.0075 | 0.146 | 0.514 |
| 184-28-3 | 0.0085 | 0.182 | 0.466 |
| 184-28-4 | 0.100 | 0.175 | 0.572 |

EXAMPLE VIII(Inventive)

Use of Fibril Mats as Flow Through Electrodes

A 50 ml suspension of carbon nanotubes in water was prepared at a concentration of 1 milligram per milliliter. The suspension was subjected to sonication with a 450 watt Branson probe sonicator at full power with a 20% duty cycle for 20 minutes to insure that the carbon nanotubes were well dispersed. The dispersion was vacuum filtered onto a 0.45 μm MSI nylon filter in a 47 mm Millipore membrane filter manifold. The carbon nanotubes formed a felt-like mat that was peeled off of the nylon membrane and dried for two hours at 80° C. between two pieces of filter paper under weight to maintain flatness. The thickness (or height) of the dried carbon nanotube mat was 8 mils measured with calipers. A 13 mm arch punch was used to prepare a 13 mm diameter disk of the carbon nanotubes mat.

A electrochemical flow cell was constructed from a 13 mm, plastic, Swinney type membrane filter holder by placing a 13 mm diameter disk of gold mesh (400 mesh, Ladd Industries) on top of the membrane support and making electrical contact to the screen with a platinum wire, insulated with Teflon® heat shrink tubing, that was fed through the wall of the filter holder for external connection as the working electrode of a three electrode potentiostat circuit. The gold mesh was fixed in place with a minimal amount of epoxy around the outer edge. A strip of gold foil was fashioned into a ring and placed in the bottom, down stream section of the filter holder and connected with a platinum wire lead fed through the wall of the filter holder for external connection as the counter electrode of the three electrode potentiostat circuit. A ring of 0.5 mm diameter silver wire was electrochemically oxidized in 1M HCl, rinsed with water and placed in the top section of the filter holder with the end of the wire led out through the wall for external connection as the reference electrode in the three electrode potentiostat circuit.

The appropriate external contacts on the flow cell were connected to the working, counter and reference leads of an EG&G PAR 273 potentiostat. The flow cell was connected to a Sage syringe pump with interchangeable syringes for use of different solutions. Initial background measurements were made in 0.5M $K_2SO_4$ by examining the cyclic voltammetric response of the gold mesh to both static and flow at 0.6 milliliters/minute. The solution was switched to one containing 2.5 mM potassium ferricyanide, 2.5 mM potassium ferrocyanide, 10 mM KCl and 0.5M $K_2SO_4$ in water and cyclic voltammograms were recorded in static and 0.4 mls/minute flow conditions. There was a 0.225 mA difference between the peak anodic and the peak cathodic currents at a scan rate of 10 mv/second under static, no flow conditions. These control experiments determined that the reference electrode was stable under flowing conditions and established the background current levels due to the gold mesh support.

Figure 8:
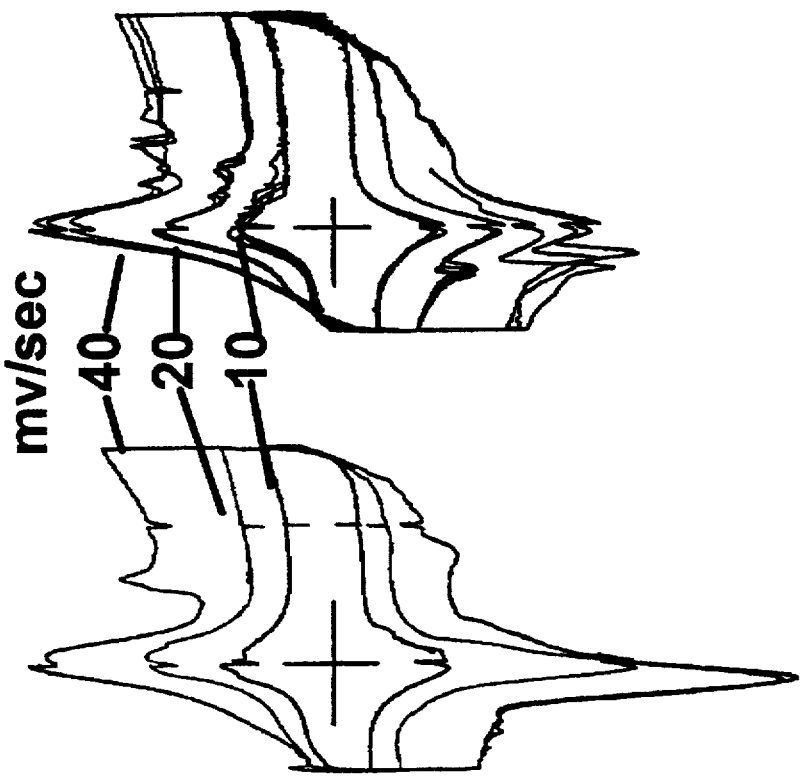
FIG. 8 is a graphical representation of the current-voltage relationship for the electrode of example 8 wherein the vertical axis represents current and the horizontal axis represents the applied potential at several potential scan rates.

The 13 mm carbon nanotube mat disk was placed on top of the gold mesh, followed by the gasket supplied with the filter holder and the top section of the filter holder. The cell was flushed with a solution containing 2.5 mM potassium ferricyanide, 2.5 mM potassium ferrocyanide, 10 mM KCl and 0.5M $K_2SO_4$ in water. Cyclic voltammograms for ferri/ferrocyanide reduction and oxidation recorded under static conditions exhibited peak currents nearly 50 times greater than observed for the gold mesh alone. There was a 12 mA difference between the peak anodic and the peak cathodic currents at a scan rate of 10 mv/second under static, no flow conditions. Furthermore, the shape of the cyclic voltammograms recorded at scan rates of 10, 20, and 40 mv/second was consistent with oxidation and reduction of ferri/ferrocyanide entrapped within the pore structure of the carbon nanotube mat electrode. Similar cyclic voltammetric shapes were recorded under flow conditions with a pumping rate of 0.4 mls/minute. The results are shown in FIG. 8 which is a graphical representation of the current-voltage relationship for the materials made according to Example 8 wherein the vertical axis represents current and the horizontal axis represents applied potential at several potential scan rates.

The terms and expressions which have been employed are used as terms of description and not of limitations, and there is no intention in the use of such terms or expressions of excluding any equivalents of the features shown and described as portions thereof, its being recognized that various modifications are possible within the scope of the invention.

I claim:

1. A composition of matter comprising a porous packed bed having a plurality of nanofibers and a number of scaffold particulates, said packed bed having a fluid flow rate characteristic for water greater than 0.5 ml/min/cm$^2$ at a pressure differential through the packed bed of about 1 atm when said packed bed has a thickness of one mil.

2. The composition as recited in claim 1, wherein said packed bed has a surface area greater than about 10 m$^2$/g.

3. The composition as recited in claim 1, wherein said nanofibers have an average diameter less than 0.1 micron and said scaffold particulates have a first dimension greater than about 1 micron and a second dimension greater than about 0.5 micron.

4. The composition as recited in claim 1, wherein said packed bed has at least one fluid flow characteristic at least two times greater than a nanofiber packed bed without said scaffold particulates.

5. The composition as recited in claim 1, wherein said packed bed comprises from 1 wt % to 99 wt % nanofibers and 99 wt % to 1 wt % scaffold particulates.

6. The composition as recited in claim 1, wherein said packed bed comprises from 5 wt % to 50 wt % nanofiber and 90 wt % to 60 wt % scaffold particulate.

7. The composition as recited in claim 1, wherein said packed bed comprises a non-void solid volume having from 1 vol % to 99 vol % nanofibers and 99 vol % to 1 vol % scaffold particulates.

8. The composition as recited in claim 1, wherein said packed bed comprises a non-void solid volume having from 5 vol % to 50 vol % nanofiber and 90 vol % to 60 vol % scaffold particulate.

9. The composition as recited in claim 1, wherein said nanofibers have a diameter less than about 0.5 microns and a length to diameter ratio greater than about 5.

10. The composition as recited in claim 1, wherein said nanofibers are carbon fibrils being substantially cylindrical with a substantially constant diameter of less than 0.5 microns, having graphitic layers concentric with the fibril axis and being substantially free of pyrolytically deposited carbon.

11. The composition as recited in claim 1, wherein said scaffold particulates are of a shape and a size suitable for providing a scaffolding effect within said packed bed.

12. The composition as recited in claim 1, wherein said scaffold particulates have a particulate shape selected from a fiber, irregular solid, sphere, platelet, disc, pyramid or cube.

13. The composition of matter as recited in claim 1, wherein said scaffold particulates are fibers having an average diameter at least 10 times greater than the average nanofiber diameter.

14. The composition as recited in claim 1, wherein said nanofibers and said scaffold particulates comprise carbon.

15. The composition as recited in claim 1, wherein said nanofibers are carbon nanofibers and said scaffold particulates are carbon fibers.

16. The composition as recited in claim 15, wherein said particle additives are present in an amount ranging from 0.01 to 25 wt%.

17. The composition as recited in claim 1, wherein said packed bed has substantially isotropic physical properties in at least two dimensions.

18. The composition as recited in claim 1, further comprising particle additives dispersed within the packed bed.

* * * * *